March 9, 1937. A. L. WARD ET AL 2,073,083
METHOD OF GAS PURIFICATION
Filed Jan. 19, 1933
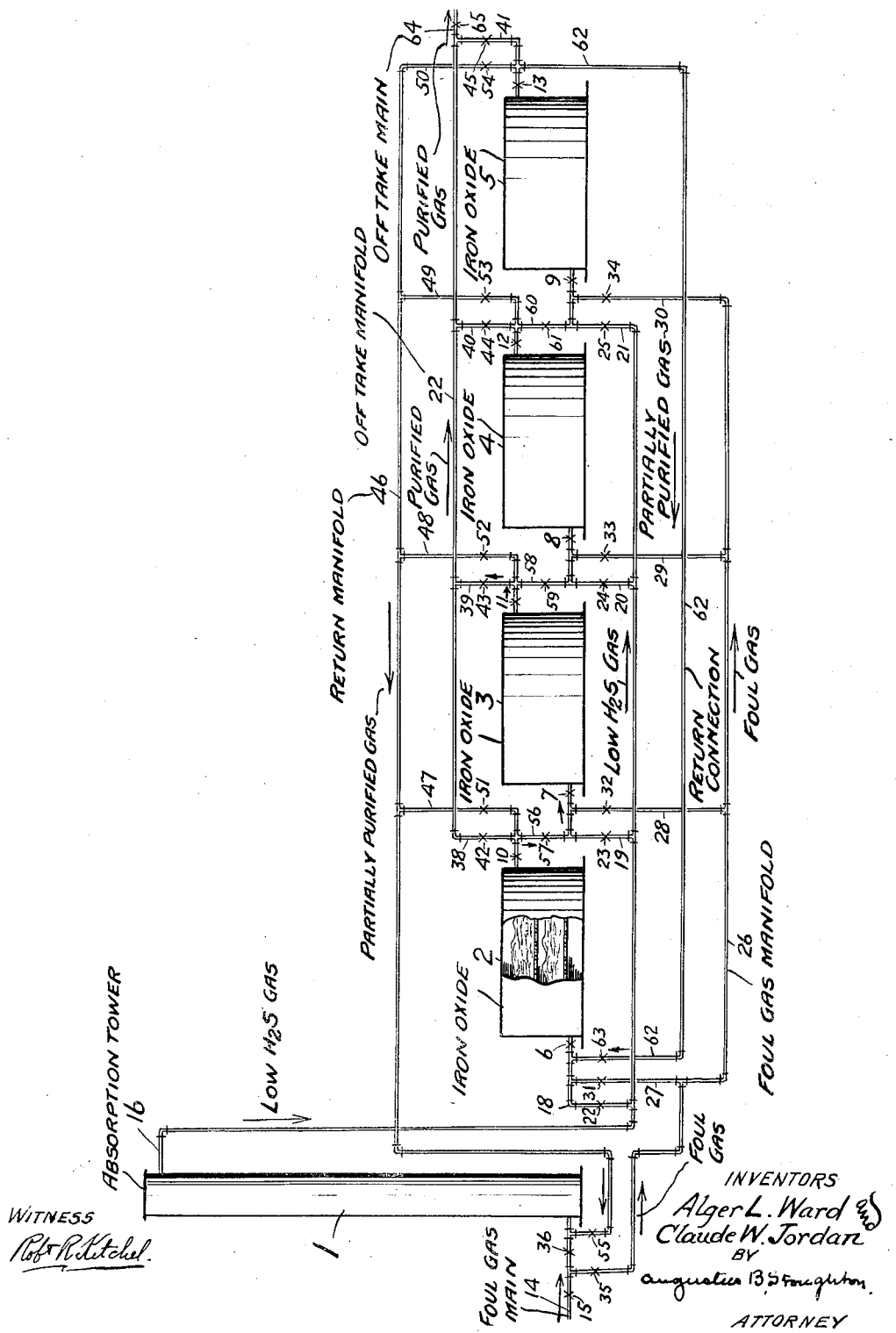

Patented Mar. 9, 1937

2,073,083

UNITED STATES PATENT OFFICE 2,073,083

METHOD OF GAS PURIFICATION

Alger L. Ward, Upper Darby, and Claude W. Jordan, Paoli, Pa., assignors to The United Gas Improvement Company, Philadelphia, Pa., a corporation of Pennsylvania Application January 19, 1933, Serial No. 652,482

7 Claims. (Cl. 23—3)

The present invention relates to gas purification.

Manufactured gas such as coal gas from coke ovens and retorts contains hydrogen sulphide from which the gas must be purified prior to distribution. It may also contain small quantities of oxides of nitrogen which in combination with hydrocarbon compounds in the gas may form gummy or resinous compounds which cause trouble in the distribution system by clogging pilots, meter valves and the like and causing improper performance of automatic appliances.

Among the methods employed for the removal of hydrogen sulphide are the so-called "liquid purification processes" in which the gas is scrubbed with an alkaline solution usually sodium carbonate which may contain other substances such as suspensions or solutions of iron, nickel or arsenic compounds.

These liquid purification processes are effective in removing hydrogen sulphide but do not remove or at least do not sufficiently remove oxides of nitrogen and very considerable trouble has been encountered due to combination of the oxides of nitrogen with various hydrocarbon compounds forming gums in distribution systems, distributing coke oven gas which has been purified by liquid purification processes.

The co-pending application, Serial No. 622,994 by Ward and Jordan, now Patent 1,976,704, describes methods of removing oxides of nitrogen from gas and preventing gum formation by contacting the gas with metallic sulphides, the most effective being iron, cobalt and nickel sulphides. The sulphide formed by sulphiding iron oxide purification material in the presence of added alkali, for instance sodium carbonate and bicarbonate, is particularly effective in this removal.

The principal object of the present invention is the provision of an improved method of removing oxides of nitrogen from the gas by contact with metallic sulphide notably iron sulphide; and the object also is the reduction of gum formations, in conjunction with the removal of hydrogen sulphide by liquid purification.

In ordinary operation of liquid purification systems with the removal of hydrogen sulphide by scrubbing with an alkaline solution, the absorption tower reduces the hydrogen sulphide content, initially for example 450 gr. per 100 cu. ft., to a low concentration of for example, 15 to 25 gr. per 100 cu. ft. This residual hydrogen sulphide is removed by contact with iron oxide in catch boxes placed in the gas flow beyond the absorption tower.

The above method of operation is satisfactory from the standpoint of hydrogen sulphide purification, the duty on the catch boxes is low, and due to the low concentration of hydrogen sulphide and the revivifying effect of the oxygen normally present in the gas the material in the catch boxes is maintained in very active condition for hydrogen sulphide removal for a long period.

From the standpoint of removal of oxides of nitrogen this method of operation is unsatisfactory, since due to the low concentration of hydrogen sulphide going to the catch boxes and the revivifying effect of the oxygen normally present in the gas, the concentration of the iron sulphide is not proper for removal from the gas of oxides of nitrogen.

In order to maintain sufficient material in the catch boxes in sulphided condition, the removal of hydrogen sulphide by the absorption tower may be decreased, passing the gas to the catch boxes with a higher concentration of hydrogen sulphide, say from 40 to 70 gr. per 100 cu. ft. or more, depending on the oxygen content of the gas, or controlled quantities of foul gas high in hydrogen sulphide may be by-passed around the absorption stage of the liquid purification system and passed through the catch boxes with the gas low in hydrogen sulphide coming from the absorption stage.

This method of operation throws more duty upon the catch boxes in the removal of hydrogen sulphide, but it permits the maintenance of sufficient sulphided material in the catch boxes for the proper removal of the oxides of nitrogen.

This provision for sufficient hydrogen sulphide in the gas passing to the catch boxes is especially desirable when highly alkaline iron oxide is employed in the catch boxes. This highly alkaline material containing, for example, 30 to 70 percent alkali present as carbonate and bicarbonate, when sulphided, forms relatively stable compounds with the oxides of nitrogen. It is however extremely active in revivification with the oxygen normally present in the gas and with very low concentrations of hydrogen sulphide in the gas passing through it, it is not maintained in sufficiently sulphided condition for the proper removal of the oxides of nitrogen.

In the present method of operation due to the increased duty of hydrogen sulphide removal thrown upon the catch boxes, it is desirable to pass the gas through a series of catch boxes.

Due to the activity of the highly alkaline oxide it may be very heavily loaded with sulphur without other revivification than with the oxygen present in the gas, so that it may be discarded after use instead of removed from the box, revivified and reused. After the material in the first box in the catch box series has ceased to remove 50 or 60% of the hydrogen sulphide in the gas entering it, this box may be switched to the foul gas side of the liquid purification absorption stage and the foul gas passed through it before passing to the absorption tower. This increases the duty secured from the material in hydrogen sulphide removal and in its heavily sulphided condition it also removes oxides of nitrogen prior to the passage of the gas to the absorption stage. It may be continued in use in this position until back pressures developed by continued loading with sulphur require removal. This material especially if lightly loaded on the chips or other contact material employed may be so heavily loaded with sulphur as to warrant its discarding without reuse.

The invention will be more particularly described in connection with the single figure of the attached drawing which somewhat diagrammatically illustrates the apparatus of the invention and which shows a liquid purification absorption tower in combination with iron oxide catch boxes and connections in partial elevation and partial section.

Referring to the drawing—1 indicates the absorption tower of the liquid purification system. 2, 3, 4, 5 indicate iron oxide catch boxes which are provided with gas inlet valves 6, 7, 8, 9 respectively and gas outlet valves 10, 11, 12, 13 respectively. 14 is the foul gas main provided with valve 15 which leads to the gas inlet of the absorption tower. The gas outlet 16 of the absorption tower is connected to the gas inlet manifold connected to the gas inlets of the several oxide boxes through branch connections 18, 19, 20, 21 provided with valves 22, 23, 24, 25 respectively.

The gas inlets of the several oxide boxes are also connected with the foul gas by-pass manifold 26 through branch connections 27, 28, 29, 30 provided with valves 31, 32, 33, 34 respectively. The foul gas by-pass manifold leads off from the foul gas main 14 through valve 35. Valve 36 is provided in the foul gas main on the absorption tower side of the junction of the by-pass 26.

The gas outlets of the several boxes are connected to the gas offtake manifold through branch connections 38, 39, 40, 41 respectively provided with valves 42, 43, 44, 45 respectively. The gas outlets of the several boxes are also connected to the by-pass return manifold 46, through branch connections 47, 48, 49, 50 provided with valves 51, 52, 53, 54 respectively. Return by-pass connection 46 leads back through valve 55 to the gas inlet of the absorption tower 1, being connected on the tower side of valve 36.

The gas outlet of box 2 is connected to the gas inlet of box 3 by the connection 56 provided with valve 57. The gas outlet of box 3 is connected to the gas inlet of box 4 by connection 58 provided with valve 59. The gas outlet of box 4 is connected to the gas inlet of box 5 by connection 60 provided with valve 61. The gas outlet of box 5 is connected to the inlet of box 2 by the connection 62 provided with valve 63. 64 provided with valve 65 is the main for leading away the purified gas.

In describing the practice of the invention by means of the operation of the apparatus of the drawing, it will be assumed for illustration that box 4 is out of the system for refilling and that the boxes are in series in the flow of the gas in the order 5—2—3.

Foul gas containing hydrogen sulphide for instance 450 gr. per 100 cu. ft. passes through the main 14 and valves 15 and 36 to the gas inlet of the absorption tower 1 where the gas in its passage to the outlet 16 is scrubbed with an alkaline solution reducing its hydrogen sulphide content for illustration to 15 gr. per 100 cu. ft. This low hydrogen sulphide gas passes to the inlet manifold and through branch connection 21 and valves 25 and 9 to the gas inlet of box 5, at the same time foul gas is admitted through valve 35 to the by-pass connection 26 and is passed through branch connection 30 and valves 34 and 9 to the gas inlet of box 5 passing through the material arranged therein with the low hydrogen sulphide gas from the tower. For instance 10 cu. ft. of foul gas is admitted through the by-pass connection 26 for every 100 cu. ft. passed through the inlet manifold 17, increasing the hydrogen sulphide content of the gas passing through box 5 to 60 gr. per 100 cu. ft. The gas passes through the material in box 5 and through valve 13 to the return connection 62 and valves 63 and 6 to the gas inlet of box 2 and through the material therein to the gas outlet, passing through valve 10 connection 56 valve 57 and valve 7 to the gas inlet of box 3. The gas then passes through the material in box 3 to its gas outlet and thence through valves 11, 43, branch connection 39 and the offtake manifold 22 and valve 65 and the offtake main 64 to storage or other disposal.

The contact of the gas with the iron sulphide in the material in the boxes removes the oxides of nitrogen or reduces them to a safe concentration. The passage of sufficient hydrogen sulphide into the first box of the series, 5 in this instance, secures the maintenance of sufficient iron sulphide in the boxes for this purpose, the succeeding boxes remove the hydrogen sulphide.

Instead of admitting all of the by-passed foul gas to box 5, some of this gas may be admitted through the branch connection 27 and valve 31 to the gas inlet of box 2.

In the above operation other valves than those mentioned above are assumed to be closed.

After the material in box 5 is no longer removing 50 to 60% of the hydrogen sulphide in the gas entering it, this box may be switched to the foul gas side of the absorption tower by closing valves 36, 63, 25, opening valve 35 wide, and also opening valves 54, 55, 22. The foul gas then passes from the foul main 14 through valve 35 and the by-pass manifold 26, branch connection 30 and valves 34 and 9 and through the material in box 5 and thence through valves 13 and 54 and the branch connection 50 to the return manifold 46 and through valve 55 to the gas inlet of the absorption tower.

After passing through the tower the gas passes by connection 16 to the inlet manifold 17, branch connection 18 and valves 22 and 6 to the gas inlet of box 2. By partially opening valve 31, a small quantity of foul gas is bled off from the by-pass line 26 and passed through box 2 with the gas from the absorption tower; the gas passes through the material in box 2 to the gas outlet and thence through valve 10, connection 56 and valves 57 and 7 to the gas inlet of box 3, through the material therein and through valves 11 and 43 and branch connection 39 to the offtake manifold 22 and thence through valve 65 and the offtake main 64 to storage or other disposal.

If box 4 has been refilled the gas may be passed through it from box 3 by closing valve 43 and opening valves 8, 12, 44, the gas passing from box 4 to the offtake manifold 22 and thence to the offtake main 64. If desired some foul gas may then be bled off from the by-pass manifold 26, through branch connection 28 and valve 32 to the gas inlet of box 3.

When box 5 has been sufficiently loaded with sulphur to throw too much back pressure or is no longer effective in removing oxides of nitrogen, it may be cut out of the line, and emptied and refilled. Box 2 then becomes the most sulphided box and is the next box to be switched to the foul gas side of the absorption tower.

The connections illustrated in the drawing permit the boxes to be operated in the series 5, 2, 3, 4—2, 3, 4, 5—3, 4, 5, 2—4, 5, 2, 3 or in the series 5, 2, 3—2, 3, 4—3, 4, 5—4, 5, 2 with one box out of the system for emptying and refilling and permit the switching of each box in turn to the foul gas side of the absorption tower. They also permit the by-passing of foul gas around the absorption tower to any of the boxes. In starting up operations with fresh oxide in each box an increased quantity of foul gas can be by-passed to the first box in the series or that box can be started in operation on the foul gas side of the absorption tower in order to build up its sulphide content quickly so that it will begin quickly to remove the oxides of nitrogen.

The device illustrated in the drawing may also be operated by decreasing the amount of hydrogen sulphide removed in the absorption tower, and passing the gas to the catch-boxes with a higher concentration of hydrogen sulphide, say from 40 to 70 gr. per 100 cu. ft. or more, depending upon the oxygen content of the gas.

This invention has been described with particular reference to contacting the gas with iron sulphide especially with the sulphided material formed by sulphiding highly alkaline iron oxide. It is not desired to so limit the invention although iron sulphide is the most practical sulphide to employ because of its relative cheapness.

Nor is it desired to limit the invention to application to any particular process of liquid purification as it may be used in connection with any such process which removes hydrogen sulphide effectively but which is not effective in sufficiently removing oxides of nitrogen.

We claim:

1. In the distribution of gas containing hydrogen sulphide and oxygen and oxides of nitrogen and which is scrubbed with an alkaline solution and contacted with solid purifying material for the removal of hydrogen sulphide, the step of opposing gum formation, which consists in continuously providing and maintaining in the solid purifying material a supply of metallic sulphide sufficient for removing substantially all of the oxides of nitrogen by scrubbing out a part of the hydrogen sulphide with regard to the oxygen content and leaving a modicum of hydrogen sulphide sufficient for use in continually providing and maintaining said supply of metallic sulphide in the purifying material.

2. In the distribution of gas containing hydrogen sulphide and oxygen and oxides of nitrogen and which is scrubbed with an alkaline solution and contacted with solid purifying material for the removal of hydrogen sulphide, the step of opposing gum formation, which consists in continuously providing and maintaining in the solid purifying material a supply of metallic sulphide sufficient for removing substantially all of the oxides of nitrogen by scrubbing hydrogen sulphide from the gas prior to contact with the solid purifying material and by-passing the scrubbing operation with some of the foul gas containing hydrogen sulphide and introducing it to the solid purifying material for use in providing and continuously maintaining said supply of metallic sulphide in the purifying material.

3. In the distribution of gas containing hydrogen sulphide and oxygen and oxides of nitrogen and which is scrubbed with an alkaline solution and contacted with solid purifying material for the removal of hydrogen sulphide, the step of opposing gum formation, which consists in continuously providing and maintaining in the solid purifying material a supply of metallic sulphide sufficient for removing substantially all of the oxides of nitrogen by switching sulphided purifying material from the outlet to the inlet of the scrubbing operation and containing it with the foul gas for the removal of substantially all of the oxides of nitrogen prior to scrubbing and contacting the gas with solid purifying material.

4. In the distribution of gas containing hydrogen sulphide and oxygen and oxides of nitrogen and which is scrubbed with an alkaline solution and contacted with solid purifying material for the removal of hydrogen sulphide, the step of opposing gum formation, which consists in continuously providing and maintaining in the solid purifying material a supply of metallic sulphide sufficient for removing substantially all of the oxides of nitrogen by contacting the foul gas with sulphided purifying material for the removal of substantially all of the oxides of nitrogen prior to the completion of the removal of hydrogen sulphide.

5. Apparatus for gas purification consisting of an absorption tower, a group of iron oxide catch boxes, a foul gas main, an off-take manifold to storage, and pipe connections and fittings including a foul gas by-pass, a return connection to the foul gas main, a return manifold to the foul gas main and valves, substantially as described, by which boxes of the group are connected at will to the foul gas main and to the lower outlet and in series to the offtake manifold.

6. In the distribution of gas containing hydrogen sulphide and oxygen and oxides of nitrogen and which is scrubbed with an alkaline solution and contacted with solid purifying material for the removal of hydrogen sulphide, the process of opposing gum formation, which process consists in, continuously providing and maintaining in the solid material a supply of metallic sulphide sufficient for removing substantially all of the oxides of nitrogen by contacting the foul gas with sulphided purifying material for the removal of substantially all the oxides of nitrogen prior to the completion of the removal of hydrogen sulphide, and then substantially completing the removal of hydrogen sulphide by contacting the gas from which substantially all the oxides of nitrogen have been removed with solid purifying material.

7. In the commercial distribution of gas made from gas containing hydrogen sulphide and oxygen and oxides of nitrogen, the process comprising: removing a portion of the hydrogen sulphide from the gas by scrubbing gas with an alkaline solution, continuously providing and maintaining solid purifying material having a supply of metallic sulphide sufficient for removing substantially all the oxides of nitrogen, extracting substantially all the oxides of nitrogen by means of sulphided solid purifying material by contacting the gas with the sulphided purifying material while the gas still contains hydrogen sulphide, and then removing substantially all the hydrogen sulphide from the gas.

ALGER L. WARD.
CLAUDE W. JORDAN.